Feb. 6, 1940. W. REICHE 2,189,223
FOLDING CAMERA
Filed April 22, 1938 2 Sheets-Sheet 1
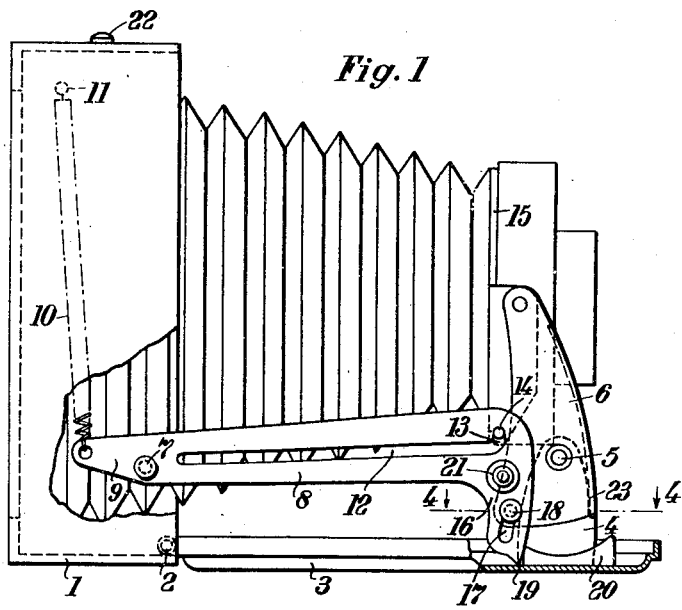
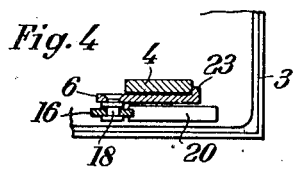
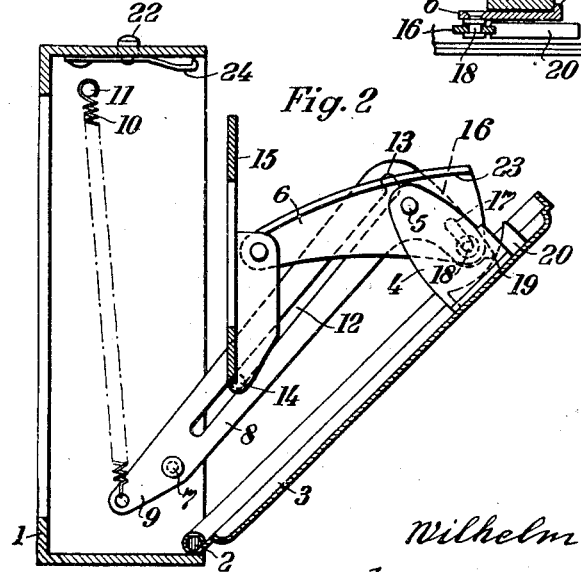
Inventor:
Wilhelm Reiche
by Franz Reinhold.
Attorney Feb. 6, 1940.　　　　W. REICHE　　　　2,189,223

FOLDING CAMERA

Filed April 22, 1938　　　2 Sheets-Sheet 2

Inventor:
Wilhelm Reiche
by Frank Reinhard.
Attorney

Patented Feb. 6, 1940

2,189,223

UNITED STATES PATENT OFFICE 2,189,223

FOLDING CAMERA

Wilhelm Reiche, Brunswick, Germany, assignor to Voigtländer & Sohn Aktiengesellschaft, Brunswick, Germany, a joint-stock company of Germany Application April 22, 1938, Serial No. 203,522
In Germany May 7, 1937, 9 Claims. (Cl. 95—40)

My invention relates to improvements in folding cameras, and more particularly in cameras of the self-erecting type in which the mechanism controlling the lens front when the base board is opened is used for holding the said base board in open position. The object of the improvements is to provide a camera of this type in which separate locking means for the said mechanism are dispensed with, and with this object in view my invention consists in constructing one of the links connecting the body of the camera with the lens front in the form of a locking device which is operative at the end of the opening movement of the base board.

For the purpose of explaining the invention an example embodying the same has been shown in the accompanying drawings, in which the same reference characters have been used in all the views to indicate corresponding parts.

In said drawings,

Fig. 1 is an elevation of the camera with a part of the body broken away and showing the same in open position, Fig. 2 is a sectional elevation showing the camera partly closed.

Fig. 4 is a sectional plan view taken on the line 4—4 of Fig. 1.

Figure 3:
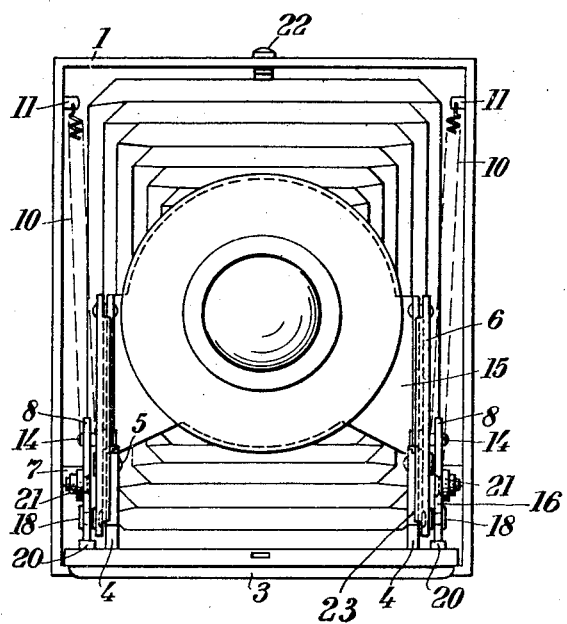
Fig. 3 is an elevation showing the open camera from the side of the object being photographed.

In the example shown in the drawings the camera comprises a body 1 having a base board 3 hinged thereto at 2. To the said base board brackets 4 are secured which have levers or struts 6 pivotally mounted thereon at 5, the said levers or struts 6 providing supports for a lens front 15. Near the hinge 2 links 8 are pivotally mounted on the side walls of the body 1 at 7, the said links having the function of erecting the said levers or struts and holding the base board in extended position. At the rear of the pivots 7 the links 8 are formed with heels to which springs 10 are attached which are attached with their upper ends to pins 11 fixed to the side walls of the body 1, the said springs tending to rock the links 8 outwardly and downwardly. At their front ends the links 8 are formed with downwardly directed arms 16 which are formed with slots 17 engaged by pins 18 secured to the levers or struts 6. The slots extend circumferentially with respect to the centre 7 of pivotal turning of the links. Laterally of the struts 6 lugs 20 are secured to the base board 3, and the inner ends of the said lugs provide shoulders adapted to be engaged by noses 19 formed on the arms 16. The top faces of the said lugs are curved around the pivots of the said struts 6.

The links 8 are formed with longitudinal slots 12 which end at their front ends into upwardly directed portions 13 providing shoulders, and the slots are engaged by pins 14 projecting laterally from the lens board. 15. Thus the bottom part of the lens board is guided within the slots 12.

To the links 8 laterally projecting pins 21 are fixed which are engaged by the hand of the attendant for rocking the links 8 upwardly and closing the camera. The struts 6 are formed at their bottom ends with laterally projecting ears 23 adapted to engage the brackets 4.

The camera is operated as follows:

When it is desired to open the camera the attendant presses a spring pressed button 22 downwardly thus releasing a spring catch 24 locking the base board in closed position. Thus the said base board 3 is rocked downwardly and outwardly by the springs 10, and during this outward movement the pins 14 of the lens front 15 slide in the slots 12 of the links 8, and the downwardly directed arms 16 of the links engaging the pins 18 erect the struts 6, until the pins 14 arrive at the outer ends of the slots 12. During this movement of the noses 19 of the arms 16 slide on the curved top faces of the lugs 20, and when the pins 14 are at the outer ends of the slots 12 the said noses have just passed the said lugs. Now the links 8 are pressed downwardly by the springs 10 so that the pins 14 and 18 engage the top ends of the slots 13 and 17. Now the struts 6 are in erected position, the lens front 15 is in vertical position, and the ears 23 engage the outer faces of the brackets 4, as is shown in Fig. 1. Thus the parts are locked in position, as will be understood from the following: Should the base board have the tendency to be pivoted further downwardly, such movement would cause a movement of the pins 18 relatively to the base board towards the pivotal axis 2 thereof. But such movement is prevented by the lugs 23 engaging the bracket 4. If it is tried to move the base board upwardly and in the direction for closing the camera the nose 19 tends to move upwardly and away from the pivotal axis 2, such movement being prevented by the lug 20. Therefore, in order to move the mechanism it is first necessary to elevate the links 8 with the nose 19 away from the lug 20. Thereafter the base board cannot be further lowered, because such movement is prevented by the lugs 23, but it can be raised because the nose 19 is now released from the lug 20.

I claim:

1. In a photographic camera that includes a body, a base-board hinged to the body and movable between closed and open positions, and a lever pivoted to the base-board and movable between collapsed and erected positions and adapted to carry a lens, the combination of a link pivoted to said body and pivotally engaging said lever and adapted to swing between collapsed and extended positions, the pivotal engagement between link and lever permissive of lost motion in a direction circumferential with respect to the centre of pivotal swing of the link, a spring engaging said link, and a shoulder upon said base-board, the parts so arranged that, under the tension of the said spring, the link moves to extended position carrying the base-board to open position and the lever to erected position, and at the end of its swing, by virtue of lost motion in the pivotal engagement mentioned, comes to locking position with said shoulder.

2. A photographic camera as claimed in claim 1, comprising in addition a front lens carried by said lever and a loose connection between said link and lens board adapted when the base board is open to hold the lens board in erected position.

3. A photographic camera as claimed in claim 1, in which the base board has a bracket rising therefrom near its front end, said bracket providing a support for said lever, and in which the said link is formed with a downwardly directed arm formed with a slot engaging a pin carried by said lever, the said slot being located so as to permit the said link to be forced by means of its spring into locking engagement with said shoulder.

4. A photographic camera as claimed in claim 1, in which the base board has a bracket and a lug rising therefrom near its front end, said bracket providing a support for said lever, and said lug providing the said shoulder, and in which the said link is formed with a downwardly directed arm formed with a slot engaging a pin carried by said lever, the said slot being located so as to permit the link to be forced by means of its spring into locking engagement with said shoulder.

5. A photographic camera as claimed in claim 1, comprising in addition a lens board carried by said lever, said link being formed with a longitudinal slot directed at its front end upwardly to provide a shoulder, and a pin secured to said lens board and engaging the said longitudinal slot of said link, the upwardly directed portion of said slot providing a shoulder holding said lens board in erected position.

6. The structure of claim 1, the pivotal engagement between link and lever consisting of a slot in the link and a pin borne by the lever.

7. In a photographic camera that includes a body, a base-board hinged to the body and movable between closed and open positions, a bracket secured to the base-board, and a lever pivoted to the bracket and movable between collapsed and erected positions and adapted to carry a lens, the said lever being provided with a marginal, bracket-engaging flange, limiting the range of its swing from collapsed to erected position, the combination of a link pivoted to said body at a point remote from the point of hinging of said base-board, the said link pivotally engaging said lever and adapted to swing between collapsed and erected positions, the pivotal engagement between link and lever permissive of lost motion in a direction circumferential with respect to the centre of pivotal swing of the link, a spring engaging said link, and a shoulder upon said base-board, the parts so arranged that, under the tension of the said spring, the link moves to extended position carrying the base-board to open position and the lever to erected position, and, at the end of the swing, by virtue of the lost motion in the pivotal engagement mentioned, comes to locking position with said shoulder, securing the engagement of the flanged lever with the bracket and securing the base-board against turning on its hinge.

8. In a photographic camera that includes a body, a base-board hinged to the body and movable between closed and open positions, and a lever pivoted to the base-board and movable between collapsed and erected positions, the combination of a lens front pivotally mounted on said lever, a link pivoted to said body and pivotally engaging said lever and adapted to swing between collapsed and extended positions, the pivotal engagement between link and lever permissive of lost motion in a direction circumferential with respect to the centre of pivotal swing of the link, the link being slotted in radial direction with respect to its centre of pivotal swing and the slot at its outer end being turned circumferentially in a direction opposite to that of the link in swinging to extended position, the said lens front being equipped with a pin engaging the slot in the link, a spring engaging said link, and a shoulder upon said base-board, the parts so arranged that, under the tension of the said spring, the link moves to extended position carrying the base-board to open position, the lever to erected position, and the lens front to operative position, and at the end of its swing, by virtue of the lost motion in the pivotal engagement mentioned and the circumferential extension in the slot formed in it, comes to locking position with said shoulder.

9. In a photographic camera that includes a body, a base-board hinged to the body and movable between closed and open positions, and a lever pivoted to the base-board and movable between collapsed and erected positions and adapted to carry a lens, the combination of a link pivoted to said body and pivotally engaging said lever and adapted to swing between collapsed and extended positions, the pivotal engagement between link and lever permissive of lost motion in a direction circumferential with respect to the centre of pivotal swing of the link, a spring engaging said link, and a lug borne by the base-board and presenting an arc-shaped supporting surface for the tip of said link and a terminal shoulder adapted to afford abutment for the tip of the link, the parts so arranged that, under the tension of said spring, the link moves to extended position carrying the base-board to open position and the lever to erected position, and at the end of its swing, passing beyond engagement with the arc-shaped surface of the lug, by virtue of the lost motion in the pivotal engagement mentioned, swings to a position of abutment with the shoulder of said lug.

WILHELM REICHE.